Figure 2:
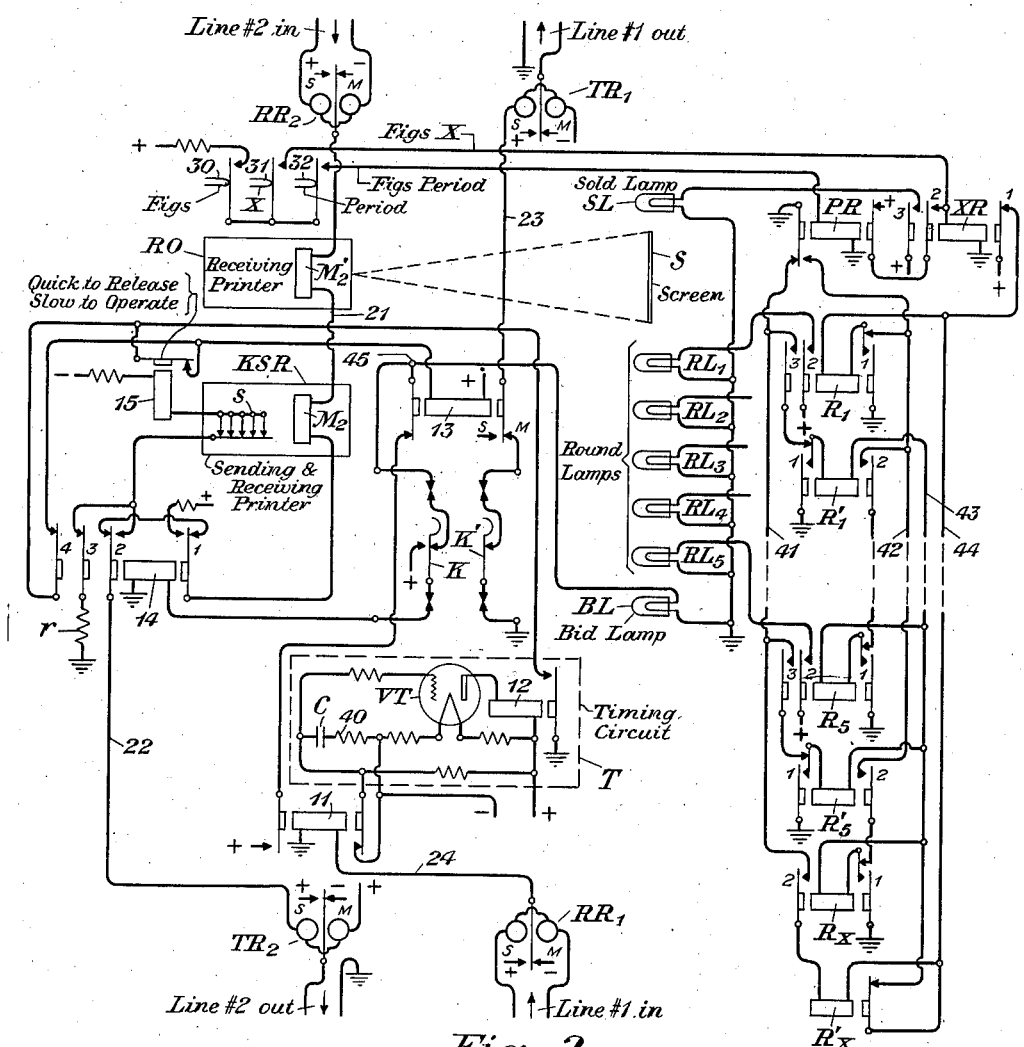

May 30, 1944.   C. A. BORGESON   2,350,146
TELEGRAPHIC AUCTION SYSTEM
Filed June 10, 1942

INVENTOR
Carl A. Borgeson
BY Claude C. Rose
ATTORNEY

Patented May 30, 1944

2,350,146

UNITED STATES PATENT OFFICE 2,350,146

TELEGRAPHIC AUCTION SYSTEM

Carl Anders Borgeson, Red Bank, N. J., assignor to American Telephone and Telegraph Company, a corporation of New York Application June 19, 1942, Serial No. 446,465

14 Claims. (Cl. 177—353)

This invention relates to telegraphic systems to facilitate sales of commodities by auction where the parties participating in the auction are located in widely separated places.

An economic need exists for communication facilities which will enable parties, widely separated geographically, to take part in an auction of certain commodities. For example, the commodities to be auctioned may be farm products stored in warehouses in various parts of the country, or, in some instances, on farms where the crops are grown. The buyers will buy from descriptions of the various groups of commodities to be sold, and the auction may be conducted at some central point at which it may not be convenient for all of the buyers to be present. It is therefore proposed by the present invention to provide communication facilities to enable such an auction to be held and the goods sold without the buyers being present at the point where the auction is held.

In arrangements previously proposed for this purpose, the various parties taking part in the auction are each provided with teletypewriter facilities, including both transmitting and receiving equipment, and all of the teletypewriter installations are connected together on the same circuit so that information as to bids may be communicated back and forth between the buyers and the auctioneer. Each party participating is provided with facilities for indicating the status and progress of the auction, and for projecting upon a board or a screen information as to the bids and other matters which are typed upon the tape of the teletypewriter machine. The facilities associated with the board or screen involve a dial of a large clock, which is graduated into seconds and is provided with a pointer which rotates during the period that bids can be placed. Certain signal lamps are also provided, one to indicate that bidding may take place, and another to indicate that the commodity or group of commodities, upon which bids have been received, has been sold.

It has heretofore been proposed to operate a system of this type in such manner that before the auction takes place, the auctioneer will send from a central point descriptions of the lots to be sold, and such descriptions will be received upon the teletypewriter apparatus of the various bidders. The lots may be identified by numbers or other code arrangements. When all parties have been informed of the commodities to be sold the auctioneer is ready to proceed. The "bid" lamp will be lighted on the boards at each of the stations, and a special signal will be sent which causes the hands or pointers of the clocks on each of the boards to rotate. The bid lamps will remain lighted during this rotation and the pointers of the clocks will continue to move for a definite number of seconds during which any buyer may bid.

If no buyer bids, the pointer of the clock will come to a stop after it has rotated the required number of seconds, and the bid lamp will then be extinguished and the "sold" lamp will be lighted. If, however, during the bidding period a buyer does wish to bid, he will seize the circuit by sending another special signal which will restore the pointers of the clocks at all the stations to their normal positions. The bidder will then, by using the sending element of his teletypewriter, transmit his bid to all of the stations, including the auction room, and at each station it will be projected upon the screen thereat. When the bid has been sent, the special signal which starts the pointers rotating will also be sent, so the clocks will again rotate and indicate the passing of a new period during which other bids may be received. When, after all bids are in, the clock makes a final complete rotation, the sold lamp will be lighted to indicate the lot has been sold. Then the number or other code identifying a new lot is sent out from the auction room, and the bid signal is again transmitted, whereupon the sale of the new lot proceeds as in the case of the first lot.

There are several difficulties in the operation of a system such as has been above described. The principal difficulties are (1) trouble arising due to contention for the circuit by two or more bidders desiring to transmit bids on the teletypewriter network at the same time; and (2) difficulties due to the propagation time of the circuit, which results in the clocks at the various stations not starting at the same time. In consequence, a lot may be marked sold on one or more clocks where the full bidding time has elapsed, whereas at other points the clocks will not have started so soon due to the propagation time of the circuit, and hence the bidding time will appear to be still running.

It is the purpose of the present invention to provide arrangements whereby these difficulties may be overcome, and all parties given an equal opportunity to bid on any commodity put up at auction, without interference between different bidders.

This may be accomplished by connecting all of the stations in the form of a ring instead of connecting them in tandem on a common line. Arrangements are provided whereby the auctioneer's station may control the other stations in such a manner that each of the buyers has an equal period of time in which to place his bid, these periods of time for the different stations following each other in sequence. During the particular period of time assigned to a given station a bid may be placed at that station and no other.

Difficulties arising from the fact that the circuits have a finite velocity of propagation will be eliminated because the time assigned to each station is determined by timing apparatus controlled from the master station at which the auctioneer is located. The only effect of the propagation time on the circuit will be to increase by a small amount the total amount of time required to give all of the stations an opportunity to bid. No contention for the circuit will arise because each station will at its particular bidding time have exclusive use of the circuit.

Figure 1:
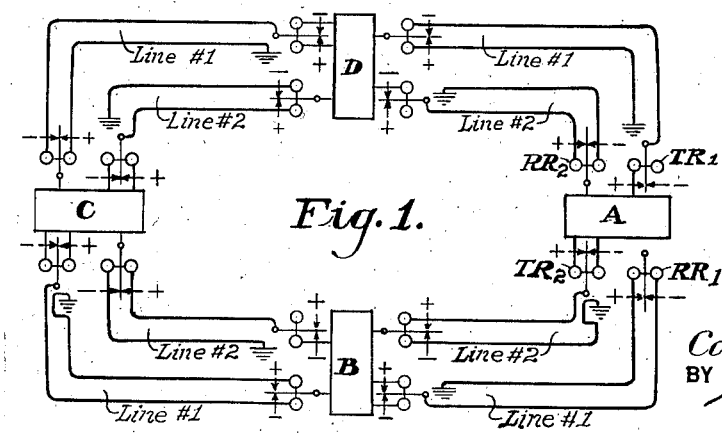

The invention will now be more fully understood in connection with the following detailed description, when read in connection with the accompanying drawing, in which Figure 1 shows the schematic layout of the circuit and Fig. 2 is a circuit diagram illustrating the circuit arrangements at a subscriber's station for operating the printer equipment and the apparatus associated with the display board or screen.

The general layout of the system is shown in Fig. 1 in which it is assumed that there are four stations A, B, C and D, although it will be understood that in practice any desired number of stations may be provided. These stations are interconnected by a circuit in the form of a duplex ring which may be thought of as two one-way ring circuits. One of these comprises line No. 1 (see Fig. 2), which is used for control purposes and functions to assign to each station the time when that station may bid, whereas line No. 2, the other circuit, will be used for communication purposes. In Fig. 2 the apparatus within each of the boxes A, B, C and D may be identical with that shown in Fig. 2.

At the control station where the auctioneer is located, certain keys such as K and K' are provided as shown in Fig. 2 to enable the auctioneer to control the timing arrangement and signaling equipment of the other stations. At the other stations the wiring of Fig. 2 may also be used. However, these need not be provided with the controlling keys, since the keys are not used by subscribers placing bids. In any event the keys at these stations are not to be used during bidding operations.

As shown in Fig. 2, each subscriber is provided with a receiving-only printer RO and a combined keyboard sending and receiving printer KSR. The former is provided with an optical arrangement of a type well known in the art to throw upon the screen S the message which is printed upon the tape of the teletypewriter. The teletypewriter mechanisms may assume any well known form, such, for example, as a teletypewriter of the No. 14 type, manufactured by the Teletype Corporation of Chicago, Illinois, which prints its message upon a tape. The instrument KSR is used for keyboard sending and for recording any message which is sent out as well as all messages received from other stations. A timing circuit T is also provided for determining the amount of time which, in response to the control signal, is allotted to the station for placing a bid. In this type of arrangement no clock with its dial and pointer is associated with the screen S.

A "bid" lamp BL is associated with the screen, this lamp being caused to glow during the period in which the buyer at that station is free to place a bid. A "sold" lamp SL is also associated with the screen, the glowing of this lamp indicating that the lot of goods has been sold. The "sold" lamp is only actuated after the bidding time has been passed successively to all of the stations around the ring without any station having made a bid during the entire round.

In addition to the foregoing lamps, five "round" lamps $RL_1$ to $RL_5$ are provided. The first of these lamps is lighted under the control of the master station when the first round of bidding is ready to proceed. If a bid is placed during the first round, another opportunity must be given to each of the stations to place a competing bid and for this purpose the second lamp $RL_2$ is caused to glow. In a similar maner the other "round" lamps are caused to glow during successive rounds of bidding until a complete round is made without any bids being placed, whereupon the "sold" lamp will be lighted and the lot sold to the highest bidder.

While five "round" lamps have been illustrated it will be understood that any desired number of such lamps may be provided. The circuits of the "round" lamp are controlled by a relay chain including relays $R_1$, $R_1'$, etc.—$R_5$, $R_5'$, $R_x$ and $R_x'$. These relays are operated sequentially under the control of a relay PR. The chain relays may be all released by a relay XR which also functions to actuate the "sold" lamp SL. The relays PR and XR are controlled by the receiving printer RO and for this purpose it has certain of its pull bars (which function to operate the type bars of the printer) provided with contact springs for closing circuits, as will be described later.

The local circuit 21—22 of line No. 2 is controlled by an incoming receiving relay $RR_2$, and in turn controls an outgoing transmitting relay $TR_2$ for sending printer signals around the ring. Normally the local circuit is closed through, but it may be broken by the relay 14 to enable the station to send messages around the ring over line No. 2. For this purpose the relay 14 may be operated either by the key K provided at the master station, or by a relay 11 in local circuit 24 under control of the receiving relay $RR$, of line No. 1. The local circuit 23—24 associated with line No. 1 at each station, also includes a transmitting relay $TR_1$ for passing signals on to the next station around the ring, either from the local station itself, or through the local station from the master station.

Further details of the apparatus will be clear from a detailed description of the operation. Let us assume that the controlling keys K and K' are provided at the master station. At that station the local circuit 23 will be normally closed over the key K' so that line No. 1 will be operated through the station. Likewise, the local circuit passing over conductors 21 and 22 will interconnect the incoming and outgoing parts of circuit No. 2 through the station if key K is normal. Control of these circuits (No. 1 and No. 2) may be exercised through keys K and K' at the master station. At the other stations the keys will at all times be retained in their normal closed position during bidding.

Before the auction starts, the auctioneer at station A will cut circuit No. 2 to send to all stations around the ring information concerning the various products to be auctioned, including the lot numbers of the various products. This he does by throwing key K to complete a circuit from positive battery over the contact of said key and through the winding of the relay 14 to ground. At its right-hand contact relay 14 opens the normally closed local circuit through the station which extends over the negative marking contact of relay $RR_2$, over circuit 21 which includes the operating magnet $M_2'$ of the receiving-only printer RO and the operating magnet $M_2$ of the keyboard sending and receiving printer KSR, over back contact No. 1 of relay 14, over conductor 22 and through the transmitting relay $TR_2$ to positive battery.

At the front contact of its spring 1 relay 14 connects positive battery to the circuit 21 including the magnets of the two printer units so that the incoming section of line No. 2 will still be able to operate the receivers. At the front contact of its spring 2 relay 14 connects circuit 22 (including the transmitting relay $TR_2$) through the keyboard sending contacts S of the instrument KSR, and through the winding of relay 15 to negative battery. At its contact 3 relay 14 opens a previously existing local circuit which extended through the relay 15, the keyboard sender S, and over said contact 3 through a resistance r to ground. At its contact 4 relay 14 opens one path through the relay 13. While an alternative path is closed over the contact of relay 15, relay 13 is not energized at this time because its circuit is normally open at the contact of relay 12 of the timing circuit T.

By operating the sender S the auctioneer can send information through the transmitting relay $TR_2$ over the outgoing part of line No. 2 and thence around the ring through the other stations, the signals finally returning to the auctioneer's station over receiving relay $RR_2$, causing its armature to shift back and forth from marking and spacing in accordance with the code, and thereby operating the receiving elements of printers RO and KSR. At each of the other stations B, C and D the local circuits 21 and 22 will be connected together over the back contacts of springs numbered 1 and 2 of relay 14 at such stations, so that the printer signals received at those stations will operate the corresponding receiving-only and combined sending-receiving printers at said stations.

When the preliminary information has been transmitted by operating the sender S in the manner described, the auctioneer will inform all of the buyers to arrange the circuits of their stations for the auction. The keys K and K' at the buyers' stations should be in normal position.

The auctioneer will now throw the key K to operate the relay 14, and by using his sender S will transmit around the ring the lot number of the first group of commodities to be sold. This will be projected on the screen such as S at each of the stations, including the auctioneer's station. The auctioneer will then send some special code, for example "figures-period," to operate the first "round" lamp. In response to the code combination for "figures," which shifts the platen of the printer to the upper case position, the receiving printer RO at each station will operate the pull bar 30, corresponding to "figures," thus preparing a connection to the positive battery over the contact of said pull bar. The pull bar 30 will remain actuated until the un-shift or "letters" signal is later sent, as the purpose of the "figures" pull bar is to shift the platen to the upper case position. Consequently when the auctioneer, immediately after the "figures" code, sends the code for the character, "period," or for whatever other character is used for this purpose, the pull bar 32 will momentarily close its contact, and a circuit will be completed from positive battery over contacts of pull bars 30 and 32, and through the winding of relay PR to ground.

At its left-hand front contact, relay PR completes a momentary circuit from ground over the normal contact of spring 1 of relay $R_1$, through the winding of said relay and over the back number 1 contact of relay XR to positive battery. Relay $R_1$ at the front contact of its spring 1 completes an obvious locking circuit for its own winding, and at the front contact of its spring 2 completes a circut through the "round" lamp $RL_1$, while at the front contact of its spring 3 it prepares a circuit for the relay $R_1'$. As soon as the momentary impulse through the relay PR ceases, it releases its contacts, and at its back left-hand contact completes a circuit from ground over the front contact of spring 3 of relay $R_1$, over the normal contact of spring 1 of relay $R_1'$, through the winding of said relay, over conductor 43, back contact of relay $R_x'$, over conductor 44, and over the back contact of spring 1 of relay XR to positive battery. Relay $R_1'$ locks up at its contact spring 1 and its contact 2 prepares a circuit for the next relay in the chain, which would be relay $R_2$ (not shown).

The glowing of "round" lamp $RL_1$ at each buyer's station indicates to all of the buyers that the first round of bidding is ready to proceed. The auctioneer now restores his key K to normal, thus opening the circuit previously traced for the relay 14 and releasing said relay. He also opens the contact of key K', thus breaking the circuit previously existing from positive battery through the winding of the transmitting relay $TR_1$, over conductor 23, over the back right-hand contact of relay 13, over the normally closed contact of Key K' to ground. The opening of this circuit causes the relay $TR_1$ to shift its armature from marking to spacing and thereby send a spacing signal out over line No. 1.

When this signal arrives at station B the receiving relay $RR_1$ of line No. 1 at that station will shift its armature from marking to spacing and will thereby open the circuit 24 through the winding of the relay 11. Relay 11 at its left-hand back contact completes a circuit from battery over the back left-hand contact of relay 13 to point 45, where the circuit divides, one part proceeding through the bid lamp BL to ground, and the other branch proceeding through the winding of the relay 14 at station B to ground. The glowing of the bid lamp indicates that the buyer at station B now has his opportunity to bid. The energization of relay 14 cuts the local circuit of line No. 2 at said station, so that the key sender S is now connected to the circuit corresponding to 22 at said station. The contact corresponding to 4 of relay 14 at that station is opened so that the circuit of the relay 13 is under the joint control of relay 15 and the relay 12 of the timer T at said station B.

Relay 11 at said station also opens its right-hand contact and thereby sets the timing circuit T into operation. Normally a negative battery is applied to the grid of the vacuum tube VT of the timing circuit over the back contact of the relay 11, thus charging the grid to such a negative potential that no current flows through the relay 12. The opening of the right-hand contact of relay 11, however, removes this negative potential from the grid and opens the short circuit normally connected across the condenser C and its series resistance 40. As a result the condenser C is gradually charged by the negative battery to gradually build up on the grid of the tube VT a potential that will permit a sufficient plate current to flow to energize relay 12. Therefore, after a predetermined time the relay 12 operates and completes a circuit for the relay 13, unless, as will be described later, the buyer at station D places a bid during this time interval. The circuit for relay 13 may be traced from ground over the contact of relay 12, over the normally closed contact of relay 15, through the winding of relay 13 to positive battery.

Relay 13 is energized by the circuit above described and at its left-hand contact opens the circuit previously traced for the relay 14. Relay 14 is thereby restored to normal, disabling station B's keyboard sender S at contact 3 of said relay 14, and connecting the local circuit for line No. 2 through the station by the junction of circuits 21 and 22 over the back contacts of springs 1 and 2 of said relay. Relay 13 at its right-hand contact opens circuit 23 of relay TR1 at station B, and thereby sends a spacing signal over the section of line No. 1 extending from station B to station C, thus causing the bid lamp at station C to glow, and causing the keyboard sender S at station C to be put in condition to send over the outgoing section of line No. 2 to the succeeding station D.

When relay 13 at station B is operated, said relay by opening its left-hand contact opens the circuit previously traced for the bid lamp BL at said station so that at the expiration of the bidding time the bid lamp BL ceases to glow. The buyer at station B is accordingly informed that he is no longer able to bid. His inability to bid is due to the opening of said left-hand contact of the relay 13, which opens the circuit previously traced for the relay 14, thus disconnecting his keyboard sender S from the circuit 22, and connecting circuits 22 and 21 in tandem through the station so that other stations may transmit signals through the station B.

If before the relay 12 operated at station B the buyer at that station had wished to place a bid, he would have operated his keyboard sender S. The first open circuit signal sent from the keyboard would cause the relay 15 to immediately release. The relay 15 is so designed that it is quick to release but slow to pull up its armature and, consequently, when its armature thus falls off, it will hold open the circuit previously traced for the relay 13 (a parallel branch of said circuit being already open at contact 4 of relay 14), so that when the relay 12 of the timing circuit operates, it is unable to complete the circuit for the relay 13. Because relay 15 is slow to pull up it is not operated by signaling pulses. Consequently, so long as the operator at station B is sending signals from the keyboard sender S, the relay 15 remains deenergized and the relay 13 is prevented from operating.

The bid sent by the operator at station B is transmitted over transmitting relay TR2 to the outgoing section of line No. 2 of said station and over the ring through stations C, D and A and thence back to the receiving printers RO and KSR at station B. The bid is therefore recorded on the printers at all of the stations, and is thrown upon the screen at each station by the optical system associated with the receiving-only printer thereat. This optical system may, of course, be of any type commonly known in the art. After the bid has been sent, the relay 15 at station B will again operate, and if the contact of the relay 12 has in the meantime been closed, the relay 13 at station B will be energized to pass the spacing signal on to the next station C in the manner already described.

If station C does not place a bid the timing circuit operates at station C to pass the spacing signal on to station D. If station D places no bid the spacing signal is finally passed on to station A where it arrives on the incoming side of line No. 1 and operates the receiving relay RR1 from marking to spacing. This opens the circuit of the relay 11, which causes the bid lamp at station A to glow and causes the relay 14 at station A to be operated. Relay 14 again opens the local circuit of line No. 2 at station A, and the auctioneer can once more operate his sending keyboard S. He now transmits the "figures-period" code combination a second time, thus again causing the operation of relay PR. The momentary operation of the left-hand contact of relay PR completes a circuit at each of the stations over contact 2 of locked up relay R1' and over normally closed contacts of spring 1 of the next switching relay in the chain (not shown) to energize said relay and cause "round" lamp No. 2 to glow at each of the stations. As the armature of relay PR falls off it operates the succeeding relay of the chain (also not shown) to prepare the circuit for the next switching relay of the chain, which, if it were shown, would be relay R3.

In the meantime the auctioneer, before sending the "figures-period" signal or while sending said signal, closes the key K'. This sends a marking signal over line No. 1 to station B, causing the relay RR1 thereat to shift its armature to its marking contact and energize the relay 11. The right-hand contact of relay 11 at once closes its contact, thus short-circuiting the condenser C and applying full negative potential to the grid of the vacuum tube VT, so that relay 12 is at once deenergized. Its armature falls off and opens the circuit previously traced for the relay 13, which, at its left-hand back contact, completes a marking circuit for transmitting relay TR1. A marking signal is accordingly sent on to station C, and in turn to stations D and A, so that the timing circuits at all of the stations are again restored to normal and the line No. 2 is completed through the entire ring.

The restoring of the timing circuits at the several stations takes place almost instantaneously, the marking signal being passed from station to station over sections of line No. 1 without any more delay at each station than the time required for the relays 12 and 13 to fall off. Therefore, as soon as "round" lamps RL2 at all of the stations have been lighted by the auctioneer, he immediately opens the circuit 23 of his sending relay TR1 by his key K', and thus sends a spacing signal to station B to start the second round of bidding.

If a bid is placed on the second round, the operations above described are again repeated, causing the third round lamp RL3 to glow at each of the stations, and a new spacing signal to be started around line No. 1 to give each station another opportunity to bid.

If the bidding should continue through the fourth round and the auctioneer for the fifth time send the "figures-period" signal, the relay PR at each station would energize the relay $R_5$ and lock up said relay over an obvious circuit. At each station relay $R_5$ would close the circuit of the round lamp $RL_5$ and at its third contact prepare the circuit of the relay $R_5'$. As soon as the armature of the relay PR falls off, relay $R_5'$ is energized and locked up to prepare a circuit for the relay $R_x$, which is used in case further rounds of bidding become necessary.

For example, if a sixth round of bids should be necessary, the auctioneer will again send the "figures-period" signal to momentarily energize the relay PR at each station. Relay PR at its left-hand front contact completes the circuit previously prepared for the relay $R_x$, causing said relay to be locked up over an obvious circuit.

Relay $R_x$ prepares a path for the relay $R_x'$, and when relay PR falls off its left-hand back contact completes a circuit over conductor 41, through the relay $R_x'$, over the conductor 44, and over the back contact of relay XR, to positive battery.

It will be noted that all of the chain relays previously operated were, with the exception of relay $R_1$, locked up over conductor 43, over the contact of relay $R_x'$, and thence over conductor 44 and back contact number 1 of relay XR to battery. Therefore, when the relay $R_x'$ is operated as above described, this circuit is broken and all of the chain relays which have been locked up will be restored with the exception of the relay $R_1$, whose locking circuit does not pass over the conductors 43 and 44, but passes directly to the back contact number 1 of relay XR. Consequently all of the "round" lamps will be extinguished except "round" lamp $RL_1$, which indicates that a sixth round of bids is now proceeding. Since relay $R_1$ remains operated under these conditions, relay $R_1'$, as soon as it falls off is again energized over its back contact number 1 and over contact 3 of relay $R_1$. Therefore, successive rounds of bidding will be accompanied by the operation of other relays in the chain and of additional "round" lamps, so long as bids are received on each round.

If during any round no bid is received, the auctioneer will be apprised of that fact by the spacing signal being passed around the ring and returned from the station D to the station A. This releases the relay 11 at station A, causing the bid lamp BL to light at said station. The auctioneer now knows that all of the stations on the ring have had their opportunity to bid and he also knows that no bid has been placed by reason of the fact that no bid has appeared upon the screen during this round. The release of the relay 11, of course, operates relay 14 over a circuit previously traced, so that the auctioneer is now able to use his keyboard transmitter S again.

The auctioneer accordingly uses his keyboard sender S to transmit around the ring code combinations to indicate that the lot has been sold. For example, the "figures-$x$" signal may be sent by the auctioneer. This operates pull bars 30 and 31 at each station to complete a circuit through the relay XR. The relay XR at each station at its number 1 contact opens the locking circuit for all of the chain relays, including the relay $R_1$, thus extinguishing all of the bid lamps. Relay XR is locked up over its number 2 contact and over the back right-hand contact of the relay PR. At its number 3 contact relay XR completes a circuit for the "sold" lamp SL, so that at each station the "sold" lamp is caused to glow, indicating to the buyers that the lot has been sold to the highest bidder.

Relay XR will remain operated and the "sold" lamp will continue to glow until the auctioneer sends the next "figures-period" signal to operate the relay PR and start the first round of bidding on the next lot. The relay PR at its right-hand contact opens the locking circuit of the relay XR and extinguishes the "sold" lamp.

The "bid" lamps at all of the stations were, of course, extinguished when the auctioneer threw the key K' to send a marking signal around the ring over the line No. 1. This, of course, took place before the auctioneer sent the figures-$x$ signal to operate the "sold" lamp. The marking signal thus sent operated the various relays 11 at the several stations and opened the circuits of the bid lamps BL thereat.

While this invention has been disclosed in certain specific arrangements which are deemed desirable, it will be obvious that the general principles herein disclosed may be embodied in many other organizations widely different from those illustrated, without departing from the spirit of the invention as defined in the appended claims.

What is claimed is:

1. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, and means to enable each transmitter when so set into operation to continue conditioned to exclusively transmit over the ring circuit so long as its message continues, whereby each station in succession will have an opportunity to obtain exclusive use of the circuit for transmitting.

2. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a "bid" lamp at each station, and means operating only during the period the transmitter at this station is conditioned to transmit to cause said lamp to glow.

3. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each trasmitter when so set into operation to continue conditioned to exclusively transmit over the ring circuit so long as its message continues whereby each station in succession will have an opportunity to obtain exclusive use of the circuit for transmitting, and a timing arrangement at each station to determine the length of time it will have an opportunity to obtain exclusive use of the circuit for transmitting bids.

4. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a timing arrangement at each station to determine the length of time it will have an opportunity to obtain exclusive use of the circuit for tranmitting bids, a "bid" lamp at each station, and means operating only during the period the transmitter at this station is conditioned to transmit to cause said lamp to glow.

5. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a "bid" lamp at each station, and means operating only during the period the transmitter at this station is conditioned to transmit to cause said lamp to glow, a "sold" lamp at each station, and means associated with the receiving printer at each station and responsive to a special code to cause said sold lamp to glow to indicate that the goods put up for auction have been sold.

6. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a timing arrangement at each circuit to determine the length of time it will have an opportunity to obtain exclusive use of the circuit for transmitting bids, a "bid" lamp at each station, means operating only during the period the transmitter at this station is conditioned to transmit to cause said lamp to glow, a "sold" lamp at each station, and means associated with the receiving printer at each station and responsive to a special code to cause said sold lamp to glow to indicate that the goods put up for auction have been sold.

7. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a "bid" lamp at each station, means operating only during the period the transmitter at this station is conditioned to transmit to cause said lamp to glow, a "round" lamp at each station, and means associated with the receiving printer at each station and responsive to a special code to cause said "round" lamp to glow during the entire time that all of the stations successively have exclusive control of the circuit for bidding purposes, thereby indicating to all of the stations that a round of bidding is taking place.

8. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive right of the circuit for transmitting, a timing arrangement at each circuit to determine the length of time it will have an opportunity to obtain exclusive use of the circuit for transmitting bids, a "bid" lamp at each station, means operating only during the period the transmitter at this station is conditioned to transmit to cause said lamp to glow, a "round" lamp at each station, and means associated with the receiving printer at each station and responsive to a special code to cause said "round" lamp to glow during the entire time that all of the stations successively have exclusive control of the circuit for bidding purposes, thereby indicating to all of the stations that a round of bidding is taking place.

9. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a "bid" lamp at each station, means operating only during the period the transmitter at this station is conditioned to transmit to cause said lamp to glow, a "round" lamp at each station, means associated with the receiving printer at each station and responsive to a special code to cause said "round" lamp to glow during the entire time that all of the stations successively have exclusive control of the circuit for bidding purposes, thereby indicating to all of the stations that a round of bidding is taking place, a "sold" lamp at each station, and means associated with the receiving printer at each station and responsive to a different special code to cause said sold lamp to glow to indicate that the goods put up for auction have been sold.

10. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a timing arrangement at each circuit to determine the length of time it will have an opportunity to obtain exclusive use of the circuit for transmitting bids, a "bid" lamp at each station, means operating only during the period the transmitter at this station is conditioned to transmit to cause said lamp to glow, a "round" lamp at each station, means associated with the receiving printer at each station and responsive to a special code to cause said round lamp to glow during the entire time that all of the stations successively have exclusive control of the circuit for bidding purposes, thereby indicating to all of the stations that a round of bidding is taking place, a "sold" lamp at each station, and means associated with the receiving printer at each station and responsive to a different special code to cause said sold lamp to glow to indicate that the goods put up for auction have been sold.

11. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a "bid" lamp at each station, means operating only during the period the transmitter at this station is conditioned to transmit to cause said lamp to glow, a plurality of "round" lamps at each station to indicate that different rounds of bidding are taking place, and means associated with the receiving printer at each station and responsive to a certain special code to operate one of said round lamps to indicate a particular round and responsive to repetitions of said code to operate other round lamps to indicate other rounds.

12. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to to exclusively transmit over the ring circuit so long as its message continues, whereby each station in succession will have an opportunity to obtain exclusive use of the circuit for transmitting, a "bid" lamp at each station, means operating only during the period the transmitter at this station is conditioned to transmit to cause said lamp to glow, a plurality of "round" lamps at each station to indicate that different rounds of bidding are taking place, means associated with the receiving printer at each station and responsive to a certain special code to operate one of said round lamps to indicate a particular round and responsive to repetitions of said code to operate other round lamps to indicate other rounds, and means operating in response to further repetitions of said special signal after all of said round lamps have been successively used to indicate rounds of bidding to again cause said round lamps to glow successively to indicate further rounds of bidding.

13. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a "bid" lamp at each station, means operating only during the period the transmitter at this station is conditioned to transmit to cause said lamp to glow, a plurality of "round" lamps at each station to indicate that different rounds of bidding are taking place, means associated with the receiving printer at each station and responsive to a certain special code to operate one of said round lamps to indicate a particular round and responsive to repetitions of said signal to operate other round lamps to indicate other rounds, a "sold" lamp at each station, and means associated with the receiving printer at each station and responsive to a different special code to cause said sold lamp to glow to indicate that the goods put up for auction have been sold.

14. In an auction communication system, a plurality of stations each having a normally disabled transmitter and a receiving printer, a communication circuit in the form of a ring interconnecting said stations so that signals sent from a transmitter at any station may be transmitted through all of the other stations to operate the receiving printers thereat, and thence back to the receiving printer of the station at which they originated, means controlled from one of the stations to successively condition for operation during equal limited periods the transmitters at each of the other stations so that during its limited period each transmitter may be set into operation or not at the will of the local station attendant, means to enable each transmitter when so set into operation to continue conditioned to exclusively transmit over the ring circuit so long as its message continues, whereby each station in succession will have an opportunity to obtain exclusive use of the circuit for transmitting, a "bid" lamp at each station, means operating only during the period the transmitter at this station is conditioned to transmit to cause said lamp to glow, a plurality of "round" lamps at each station to indicate that different rounds of bidding are taking place, means associated with the receiving printer at each station and responsive to a certain special code to operate one of said round lamps to indicate a particular round and responsive to repetitions of said code to operate other signals to indicate other rounds, means operating in response to further repetitions of said special code after all of said round lamps have been successively used to indicate rounds of bidding to again cause said round lamps to glow successively to indicate further rounds of bidding, a "sold" lamp at each station, and means associated with the receiving printer at each station and responsive to a different special code to cause said sold lamp to glow to indicate that the goods put up for auction have been sold.

CARL A. BORGESON.